US012752486B2

(12) United States Patent
Webb et al.

(10) Patent No.: US 12,752,486 B2
(45) Date of Patent: Oct. 6, 2026

(54) MODULAR METAL 3-D PRINTER BUILD PLATE

(71) Applicant: Relativity Space, Inc., Long Beach, CA (US)

(72) Inventors: Steven Webb, Long Beach, CA (US); Kristopher Konrath, Long Beach, CA (US); Twain Glaser, Long Beach, CA (US); Jeffrey Campbell, Long Beach, CA (US)

(73) Assignee: Relativity Space, Inc., Long Beach, CA (US)

( * ) Notice: Subject to any disclaimer, the term of this patent is extended or adjusted under 35 U.S.C. 154(b) by 518 days.

(21) Appl. No.: 18/352,995

(22) Filed: Jul. 14, 2023

(65) Prior Publication Data

US 2024/0017490 A1 Jan. 18, 2024

Related U.S. Application Data

(60) Provisional application No. 63/369,904, filed on Jul. 29, 2022, provisional application No. 63/368,609, filed on Jul. 15, 2022.

(51) Int. Cl.
*B29C 64/245* (2017.01)
*B22F 12/30* (2021.01)
(Continued)

(52) U.S. Cl.
CPC ............ *B29C 64/245* (2017.08); *B22F 12/30* (2021.01); *B33Y 30/00* (2014.12)

(58) Field of Classification Search
CPC ........ B29C 64/245; B22F 12/30; B22F 12/33; B22F 10/25; B22F 10/28; B22F 10/39;
(Continued)

(56) References Cited

U.S. PATENT DOCUMENTS

| | | | |
|---|---|---|---|
| 3,177,656 | A | 4/1965 | Tick et al. |
| 5,249,357 | A | 10/1993 | Holmes et al. |

(Continued)

FOREIGN PATENT DOCUMENTS

| | | | |
|---|---|---|---|
| CN | 111014883 | A | 4/2020 |
| CN | 214557420 | U | 11/2021 |

(Continued)

OTHER PUBLICATIONS

Extended European Search Report received for European Application No. 23185960.4, Search completed Dec. 13, 2023, Mailed Dec. 22, 2023, 20 pgs.

(Continued)

*Primary Examiner* — Galen H Hauth
*Assistant Examiner* — Baileigh Kate Darnell
(74) *Attorney, Agent, or Firm* — KPPB LLP

(57) ABSTRACT

A machinable 3-D printing build plate that can be assembled from a number of different components into the base for a metallic 3-D printing volume and other 3-D printed parts. The build plate can be assembled into a final structure then machined to the required planar tolerance such that the build quality of the part is maintained throughout the build. Additionally, because the baseline printer support structure and support device are comprised of multiple elements, if one or more goes out of tolerance or requires adjustment to accommodate a new print, it may be easily removed, replaced then machined back to the required tolerances.

20 Claims, 12 Drawing Sheets

(51) Int. Cl.
*B33Y 10/00* (2015.01)
*B33Y 30/00* (2015.01)

(58) Field of Classification Search
CPC ......... B22F 7/062; B33Y 10/00; B33Y 30/00; B33Y 40/00; B23K 26/342; B23K 26/70; B23K 37/0426; B23K 9/044
See application file for complete search history.

(56) References Cited

U.S. PATENT DOCUMENTS

| | | | |
|---|---|---|---|
| 6,945,032 | B2 | 9/2005 | Lundgren |
| 7,299,622 | B2 | 11/2007 | Haeggander |
| 10,316,792 | B2 | 6/2019 | Yousefiani et al. |
| 10,471,542 | B1 | 11/2019 | Gradl et al. |
| 10,527,003 | B1 | 1/2020 | Beck et al. |
| 12,031,199 | B2 | 7/2024 | Tonneslan et al. |
| 2014/0175076 | A1 | 6/2014 | Wang et al. |
| 2014/0251481 | A1 | 9/2014 | Kroll et al. |
| 2015/0108695 | A1 | 4/2015 | Okada |
| 2015/0298213 | A1 | 10/2015 | Beyer et al. |
| 2016/0010863 | A1 | 1/2016 | Ott et al. |
| 2016/0144575 | A1 | 5/2016 | Rizzo et al. |
| 2017/0096967 | A1 | 4/2017 | Bostwick et al. |
| 2018/0073859 | A1* | 3/2018 | Samo ..................... G01B 11/02 |
| 2018/0117854 | A1* | 5/2018 | Hart ........................ B29C 64/20 |
| 2018/0169943 | A1 | 6/2018 | Jussel et al. |
| 2018/0281064 | A1 | 10/2018 | Takahashi |
| 2018/0319097 | A1 | 11/2018 | Narayanan et al. |
| 2019/0118469 | A1* | 4/2019 | Donovan .............. B29C 64/245 |
| 2019/0202115 | A1* | 7/2019 | Van Haendel ........ B29C 64/153 |
| 2019/0283136 | A1 | 9/2019 | Ruppenthal et al. |
| 2019/0283166 | A1 | 9/2019 | Clark et al. |
| 2019/0329355 | A1 | 10/2019 | Gradl et al. |
| 2019/0381603 | A1 | 12/2019 | Lan et al. |
| 2020/0215609 | A1 | 7/2020 | Camilleri |
| 2020/0238447 | A1 | 7/2020 | Fedyk et al. |
| 2020/0238615 | A1 | 7/2020 | Staal et al. |
| 2020/0282497 | A1 | 9/2020 | Yamasaki et al. |
| 2020/0391316 | A1 | 12/2020 | Yamasaki et al. |
| 2020/0400102 | A1 | 12/2020 | Bulk et al. |
| 2021/0252642 | A1 | 8/2021 | Williams et al. |
| 2022/0205411 | A1 | 6/2022 | Bulk et al. |
| 2023/0144822 | A1 | 5/2023 | Sales |
| 2023/0173601 | A1 | 6/2023 | Gruber et al. |
| 2023/0407821 | A1 | 12/2023 | Shah Khadri et al. |
| 2024/0017340 | A1 | 1/2024 | Konrath et al. |
| 2024/0058881 | A1 | 2/2024 | Gruber et al. |
| 2024/0123532 | A1 | 4/2024 | Reid et al. |
| 2024/0219027 | A1 | 7/2024 | Wright, Jr. et al. |
| 2024/0307969 | A1 | 9/2024 | Fuller et al. |
| 2024/0390986 | A1 | 11/2024 | Fuller et al. |
| 2025/0271141 | A1 | 8/2025 | Wright, Jr. et al. |

FOREIGN PATENT DOCUMENTS

| | | | |
|---|---|---|---|
| DE | 102016225178 | A1 | 6/2018 |
| EP | 3517232 | A1 | 7/2019 |
| EP | 4074956 | A1 | 10/2022 |
| EP | 4306243 | A1 | 1/2024 |
| EP | 4309831 | A1 | 1/2024 |
| EP | 4382245 | A1 | 6/2024 |
| EP | 4450189 | A1 | 10/2024 |
| EP | 4613405 | A2 | 9/2025 |
| GB | 2491472 | B | 6/2018 |
| IN | 202314082744 | A | 6/2024 |
| JP | 2024084709 | A | 6/2024 |
| KR | 20240010439 | A | 1/2024 |
| KR | 20240010440 | A | 1/2024 |
| WO | 2019077512 | A1 | 4/2019 |
| WO | 2022099354 | A1 | 5/2022 |

OTHER PUBLICATIONS

Extended European Search Report received for European Application No. 23185961.2, Search completed Nov. 13, 2023, Mailed Nov. 21, 2023, 10 pgs.

Extended European Search Report received for European Application No. 23215073.0, Search completed Apr. 26, 2024, Mailed May 8, 2024, 14 pgs.

Extended European Search Report received for European Application No. 24164296.6, Search completed Aug. 30, 2024, Mailed Sep. 20, 2024, 12 pgs.

Atefi et al., "Optimum Dimensions of Cooling Channels for a Regeneratively Cooled Engine: A Multi-Objective Approach", AIAA Propulsion and Energy 2021 Forum, Aug. 9-11, 2021, 17 pgs., doi: 10.2514/6.2021-3579.

Bhatt et al., "Optimizing Multi-Robot Placements for Wire Arc Additive Manufacturing", International Conference on Robotics and Automation (ICRA), May 23-27, 2022, pp. 7942-7948, doi: 10.1109/ICRA46639.2022.9812318.

Blakey-Milner et al., "Metal additive manufacturing in aerospace: A review", Materials & Design, vol. 209, Article 110008, Nov. 1, 2021, 33 pgs., doi: 10.1016/j.matdes.2021.110008.

* cited by examiner

MODULAR METAL 3-D PRINTER BUILD PLATE

REFERENCE TO PRIOR APPLICATIONS

This application claims the benefit of, and incorporates by reference, U.S. Provisional Patent Application No. 63/369,904, filed Jul. 29, 2022. This application also claims the benefit of, and incorporates by reference, U.S. Provisional Patent Application No. 63/368,609, entitled "Systems for Horizontal Wire Arc Additive Manufacturing and Methods Thereof," filed Jul. 15, 2022.

FIELD OF THE INVENTION

This application generally refers to build plates for additive manufacturing. More specifically, the application relates to methods and apparatus for producing a tight tolerance building platform for additive manufacturing.

BACKGROUND

Additive manufacturing is a process by which a product or part is manufactured by adding material progressively to the base printed structure in a sequence or pattern that would result in a solid part being built. This method of manufacturing is commonly referred to as three dimensional or 3-D printing and can be done with various materials, including but not limited to plastics and metals.

3-D printing machines utilize a build plate to act as a base for printing the desired part. The feed material is placed or printed onto the build plate in sequential beads or dots which builds into sequential layers. 3D printers, including metal and polymer printers, require a smooth and flat surface to start each new print. Metal 3D printers use a metallic build plate that is typically CNC machined to achieve the appropriate surface finish (smoothness) and flatness.

SUMMARY OF THE INVENTION

The inventors discovered that, as the size or print diameter of a metal 3D printer increases, traditional CNC machining of the build plate to achieve the required surface finish and flatness becomes infeasible. Determining how to achieve the required flatness and surface finish without the aid of classic CNC machines represents a key challenge to scaling up metal 3D printer systems.

Embodiments of the invention include a metal 3D printing build plate system and methodology that allows for printing metal structures up to 18 feet in diameter or larger. The systems and methods do not rely on traditional CNC machining and instead use the machining capabilities of a 3D metal printing robot to achieve the required surface finish and flatness on a reusable build plate. In this regard, the scale of the build plate is constrained only by the reach of the print cell robot.

In some embodiments, the base of the build plate is constructed as a large-welded assembly with loose control over the flatness and smoothness of the outward facing surface (upon which a 3d printed structure is deposited). A reusable build plate is then mounted onto the base plate (the large welded assembly). The reusable build plate comprises multiple smaller CNC machined sections that, when assembled, form an annular metal surface. Embodiments can then leverage the in-cell CNC machining capabilities of the metal 3D printer robots to final machine the reusable build plate to the required surface finish and flatness, which may be verified by a laser scanner or dial indicator.

At the conclusion of a print operation, the robot can machine the base of the completed part to separate it from the build plate. The robot can then machine the excess material from the previous part away from the reusable build plate and prepare the surface for the next operation.

The innovative build plate methods and systems described in this specification can remove the dimensional constraints associated with traditional CNC machines and enable construction of larger-scale metal 3D printer systems. Certain embodiments can increase the speed of print cell construction and part production by not needing to rely on large-scale external machining operations for build plate construction or between print operations.

In some embodiments, the techniques described herein relate to a printing build plate including: a plurality of build plate assemblies, wherein each of the build plate assemblies further includes; and a plurality of build support structures, wherein each of the build support structures is configured to support a build support device on at least a portion of the build support structure and wherein, the build support device is configured to support a machinable build plate attached to the build support device such that an outer surface of the machinable build plate can be machined to an acceptable flatness tolerance; and wherein each of the plurality of build plate assemblies are connected to form a build plate volume wherein a 3-D printed part can be produces on the machinable build plate.

In some embodiments, the techniques described herein relate to a method for producing a printing build plate including: obtaining a plurality build support devices; obtaining a plurality of build support structures; obtaining a plurality of machinable build plates; assembling a plurality of build plate assemblies, wherein each of the plurality of build plate assemblies includes at least one build support structure connected to at least one of the plurality of build support devices, and wherein at least one of the plurality of machinable build plates is attached to the at least one build support device; and machining an outer surface of the machinable build plate to an acceptable tolerance.

Some embodiments relate to an additive manufacturing build plate. In an embodiment, the build plate includes: a build structure with a first planar tolerance; and a plurality of build plate assemblies, wherein each build plate assembly includes: a build support device, the build support device affixed to the build structure; and a machinable build block coupled to the build support device, the machinable build block configured such that an outer surface of the machinable build block is capable of being machined to a second planar tolerance, the second planar tolerance is more precise than the first planar tolerance; wherein each of the plurality of build plate assemblies are connected to form a build plate surface, and wherein the build plate surface is suitable for an additively manufactured part to be produced on the plurality of machinable build blocks.

In a further embodiment, the machinable build block includes a top surface configured to conform to a bottom surface of a desired article.

In another further embodiment, the machinable build block is coupled using mechanical fasteners to the build support device.

In a yet further embodiment, the mechanical fasteners are recessed from a top surface of the machinable build block.

In a still further embodiment, the machinable build block includes reference features capable of being used as a datum for an additive manufacturing process.

Some embodiments relate to a method for producing an additively manufactured article. In an embodiment, the method includes: obtaining a build structure; obtaining a plurality of build plate assemblies; wherein each build plate assembly among the plurality of build plate assemblies each includes a machinable build block; coupling the plurality of build plate assemblies to the build structure; machining an outer surface of at least one machinable build block to a first configuration with a first desired planar tolerance; additively manufacturing a first article at a first orientation on the outer surface of the at least one machinable build block; removing the first article from the machinable build block and machining the outer surface of the at least one machinable build block to a second configuration with a second desired planar tolerance, the second configuration different from the first configuration; and coupling the first article to the build structure in a second orientation and additively manufacturing a second article onto the first article.

In yet another embodiment, coupling the plurality of build plate assemblies is performed using mechanical fasteners.

In still another embodiment, the first configuration conforms to a desired bottom surface of the first article.

In another embodiment again, the second configuration includes reference features for aligning the first article when the first article is coupled to the build structure in a second orientation.

In still yet another embodiment, the first article includes first alignment features, and the second configuration of the machinable build block includes second alignment features corresponding to the first alignment features when the first article is coupled to the build structure in the second orientation.

In still another embodiment again, the machinable build block includes reference features capable of being used as a datum for an additive manufacturing process.

Some embodiments, relate to a method for producing an additively manufactured article. In an embodiment the method includes: obtaining a build structure; obtaining a plurality of build plate assemblies; wherein each build plate assembly from among the plurality of build plate assemblies includes a machinable build block; coupling the plurality of build plate assemblies to the build structure; machining an outer surface of at least one machinable build block to a first configuration with a first desired planar tolerance; and additively manufacturing a first article at a first orientation on the outer surface of the at least one machinable build block.

In another further embodiment, coupling the plurality of build plate assemblies is performed using at least one mechanical fasteners.

In yet another further embodiment, the first configuration conforms to a desired bottom surface of the first article.

In still another further embodiment, the machinable build block includes reference features capable of being used as a datum for an additive manufacturing process.

In another further embodiment again, removing the article from the machinable build block and machining the outer surface of the at least one machinable build block to a second configuration with a second desired planar tolerance, the second configuration different from the first configuration.

In yet still another further embodiment, coupling the article to the build structure in a second orientation and additively manufacturing a second article onto the first article.

In yet still another further embodiment again, a second configuration includes reference features for aligning the first article when the first article is coupled to the build structure in a second orientation.

In another further additional embodiment, a top of the at least one mechanical fastener is below a top surface of the machinable build block.

In another further additional embodiment again, the first article includes first alignment features, and the second configuration of the machinable build block includes second alignment features corresponding to the first alignment features when the first article is coupled to the build structure in a second orientation.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as embodiments of the invention and should not be construed as a complete recitation of the scope of the invention, wherein.

DETAILED DESCRIPTION OF THE INVENTION

Figure 1:
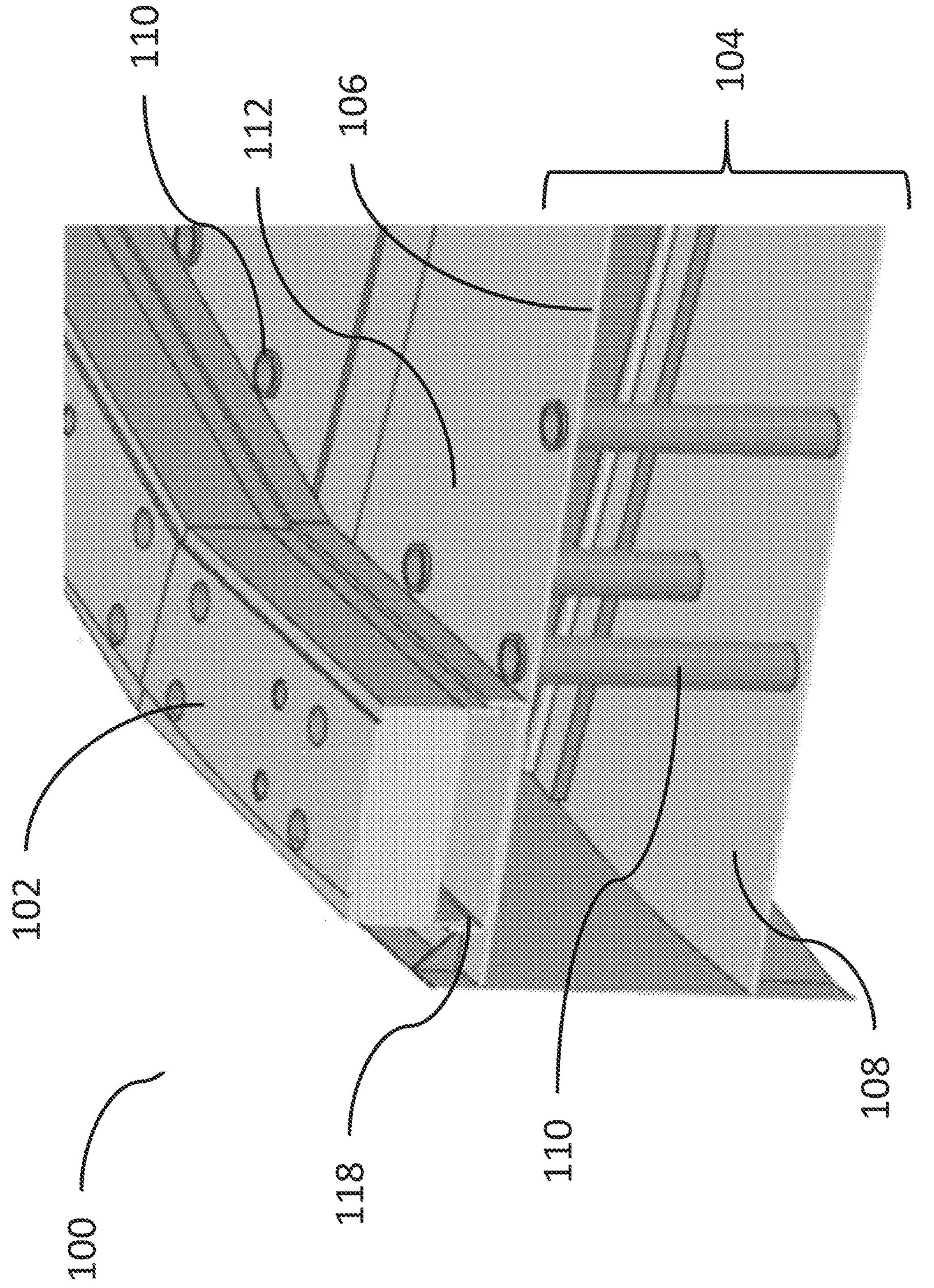
FIG. 1 conceptually illustrates a portion of a build plate for machining in accordance with embodiments. Multiple portions, each resembling a pie-shaped cartridge can be assembled into a circular build plate.

Systems and methods for producing a smooth and flat metal printing build plate for a 3-D printer are described herein. Such systems and methods can beneficially be used with a large-scale 3-D printer, such as a horizontally oriented 3d metal printer. Many embodiments are directed to a plurality of metallic support elements fixed to a base plate. Each of the plurality of metallic elements can be connected to the base plate through one or more fasteners. The various support elements can be assembled in a manner that creates a solid surface upon which a 3-D metallic part can be printed. In many embodiments, the support elements have a build block element connected thereto. The build block element has a portion or surface that can be machined to a planar tolerance that is sufficient to produce a printed 3-D metallic part without negative effects on the build. In other words, the printed part can be built without significant deviations to the design which would allow for more precise parts to be built.

The inventors recognized that, in order to produce high quality parts, the build plate needs to be level with respect to the print direction axis. They further recognized that, depending on the material and the part being built, the levelness of the build plate may require tight tolerances. They recognized that, if the build plate print surface is not level and within the desired tolerances, then the print can be defective in the build resulting in wasted materials. Accordingly, they recognized the advantage in building build plates and the underlying build support structure elements with tight tolerances. This often does not present issues with smaller parts. But, they realized that the larger the part and build support structure, the more difficult and expensive the various build structure elements and build plate will be to manufacture because it becomes more difficult and time consuming to maintain the tight tolerances required for building large complex parts.

Traditional 3-D printed parts require the use of a level or flat build surface (e.g., on the order of 0.050" and often less than 0.030") to be able to print the part. 3-D printing is also referred to as additive manufacturing, in which layers are added onto a previously applied layer. The inventors recognized that having a precision build surface is extremely important. They recognized that, if the first layer deviates from a specified planar tolerance, then subsequent layers will also deviate, leading to a final part that may deviate from the build plane significantly at its extremis. This is especially true when printing larger parts with a finished end that is located a long distance (e.g., 18 feet or more) away from the printing surface. It is recognized that small deviations in the first few layers can lead to a tolerance stack up that results in a large deviation at the finished end, which can render the part unusable. Accordingly, the inventors recognized the need for 3-D printers with a build surface that defines a flat plane within a high tolerance. Existing implementations of table-top style printers did not solve this need. With smaller table-top style printers that are designed to produce small parts, the planar tolerance required is generally not as exacting. Additionally, smaller table-top style printers naturally require less time and effort to achieve the required tolerance. Furthermore, such smaller surfaces are relatively inexpensive to produce and easily replaceable.

In contrast to prior methods of making monolithic build surfaces, many embodiments are directed to multi-component building surfaces. In various embodiments, these building surfaces are capable of being used to perform multiple prints. Desirably, when a building surface has been consumed (e.g., reused until depleted), it can be swapped out with a new building surface while most of the build continues to be reusable. In many embodiments, the tolerance of the build surface may be efficiently produced by machining the build surface using standard machining robots. Moreover, this process can be repeated to ensure the planar tolerance of the build plate is maintained over different prints.

Finally, the multiple components comprising the machinable build plate assembly allow for individual parts of the build plate assembly to be changed out independently as necessary. Embodiments also allow the printer to machine the print surface based on specific print parameters and thus prevent the need to make additional adjustments once the build surface has been installed. Furthermore, in many embodiments the adaptability and ease of configuration of the multiple component build plate allow for printed components to be removed then reattached and machined to a desired configuration and/or part tolerance.

In order to help reduce the overall cost and complexity of producing tight tolerances on build surfaces, many embodiments are directed to a multi-component build plate assembly that can be custom designed and built to any number of sizes to produce a large variety of 3-D printed parts. Furthermore, such embodiments allow for precision parts to be produced in non-traditional build volumes such as horizontally-extending build volumes vs. a more conventional vertically-extending build volume. Methods and systems for performing horizontal additive manufacturing are described in U.S. Provisional Patent Application No. 63/369,904, incorporated by reference in its entirety. Methods and systems for additive manufacturing build plates are described in U.S. Provisional Patent Application No. 63/368,609, incorporated by reference in its entirety.

For example, FIG. 1 conceptually illustrates a cross sectional view of a build plate assembly made up of multiple sections or cartridges. A build plate assembly 100 can be made up of multiple sections and/or cartridges that form the building block 102 upon which a 3-D printed part can be produced. In many embodiments, the build plate assembly 100 can have a support structure 104 that is made up of first and second structural support elements (106 and 108). The first and second support elements can be connected through a number of fasteners 110. The fasteners 110 can be any suitable fastener such that the two support elements are connected to produce the support structure 104. The support structure can have a support surface 112 that can be used to mount the building block 102, which has an outer surface upon which a part can be printed. In accordance with several embodiments of the invention, a build plate can be made up of one or more build plate assemblies (e.g., build plate assemblies 100), to produce the overall desired build volume and/or build surface.

For example, some embodiments may include a circular build plate with multiple build plate assemblies connected in such a fashion that it produces an overall circular build plate. An example circular build plate is conceptually illustrated in FIG. 1, which shows a portion of a build plate. Multiple of these pie-shaped cartridges can be assembled into an annular ring. Although at least one specific configuration of a build plate assembly is illustrated in FIG. 1, including multiple pie-shaped cartridges assembled into an annular shape, it should be understood that other embodiments may have a different configurations of support structures etc. to produce the desired shape of the final build surface.

Because the final built product (e.g., the article of manufacture) may require a high level of precision, it can be beneficial to mount a building block (e.g., the building block 102) on a build support device (e.g., a build support device 118). Beneficially, the building block positioning can be finely adjusted relative to the build support device 118 prior to and/or during mounting the building block 102 to the build support device 118. It can be appreciated that the build support structure 104 can have a build support device 118 connected to the build structure 104 on a portion thereof. In some embodiments, the build support device 118 can be attached to an outer portion or a section of the build structure 104 that is near an outer edge of the build structure 104, as shown in FIG. 1. The build support device 118 can be designed to support the final building block 102 upon which the 3-D printed part will be produced. Although the build support device 118 is included in the illustrative embodiment of FIG. 1, the build support structure is not a mandatory component of the invention. As can be appreciated, in accordance with embodiments of the invention, the structure of the build device and build surface can take on any number of forms.

Building blocks (e.g., reusable custom build plates) can be mounted to permanent build support structures (e.g., horizontal build plate structures, build support structure 104). The building blocks can be machined in-place prior to use in order to provide the appropriate surface conditions in accordance with several embodiments.

In addition to the build support structures, a build plate can include several machined parts and can be designed to be assembled in accordance with some embodiments. Building blocks can be divided into multiple sections to make machining accessible. In some embodiments, the building blocks can be divided into at least 2 pieces; at least 4 pieces; at least 6 pieces; at least 8 pieces; and at least 10 pieces.

Build plates can have machining capabilities. Some embodiments mitigate risks by machining a flat surface into a support structure (e.g., an aluminum support structure), and then placing a disposable aluminum build block as a working surface into that groove. The reusable support structures can be made with 6XXX series aluminum alloys, and can be about 2 inch in thickness. The disposable build blocks can be made with 5XXX series aluminum alloys. Aluminum sections (e.g., build blocks) can be bolted to the support structure to form the working surface. Some embodiments can use in cell machining capability and/or bring in machining capability to machine the plate assembly flat relative to the print head reference. Certain embodiments may use same machining to place concentric step features, datums and tamper guide pins. These additional features may assist part re-install and part flip operations. In a number of embodiments, the machined surface can support direct cartridge printing and/or build plate install.

Figure 2:
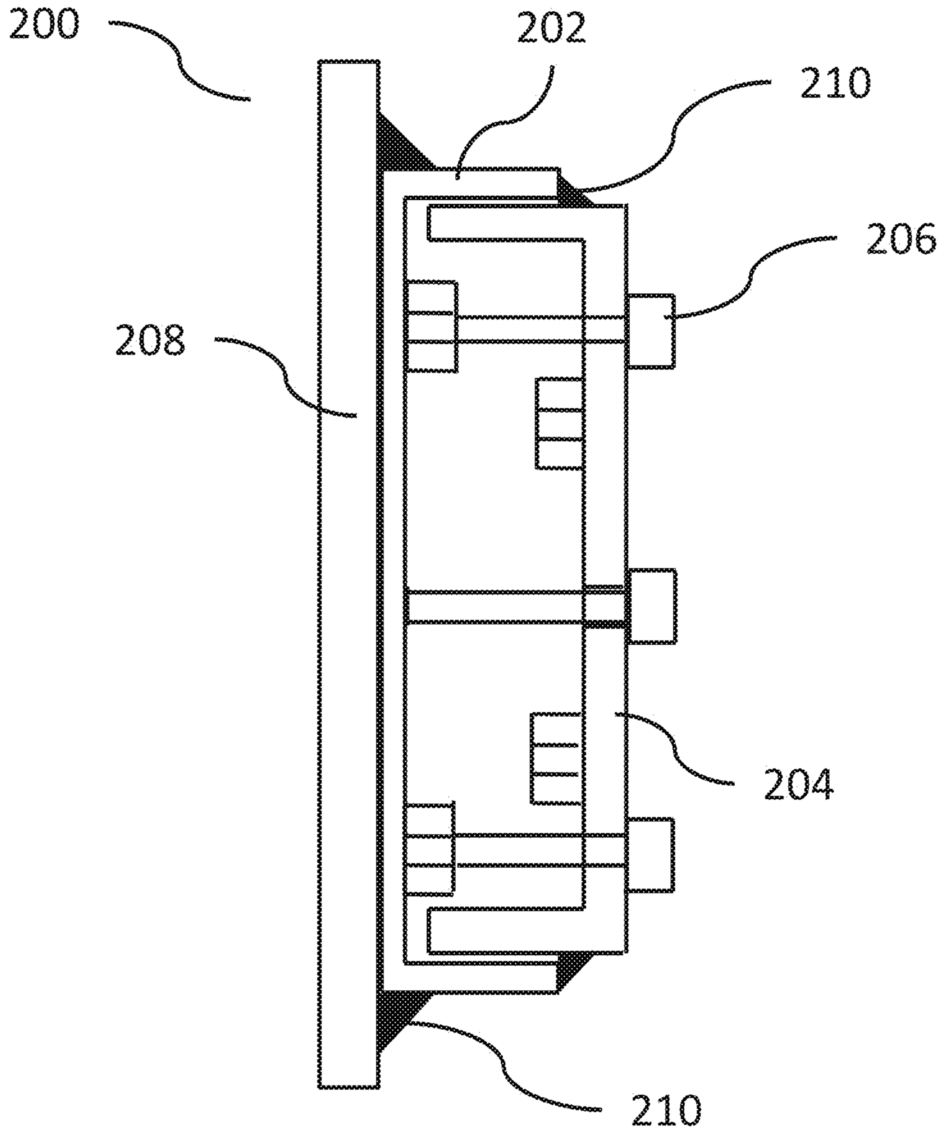
FIG. 2 conceptually illustrates a side view of a metallic 3-D build plate support assembly in accordance with embodiments.

In several embodiments, build support devices can be attached to a top surface of a support structure. Build support devices in conjunction with building blocks can provide a means to adjust the position of a build surface finely. FIG. 2 conceptually illustrates a cross sectional view of a build support device for supporting a final build surface.

A build support device 200 (e.g., the build support device having similarities to build support device 118 in FIG. 1) can be used to support a final build block (e.g., such as final building block 302). The build support device 200 can be made from two cooperatively engaging support elements 202 and 204 that are fastened together by a number of fasteners 206. The fasteners 206 can be of a suitable type that can allow for each of the support elements 202, 204 to be connected. In numerous embodiments, the support elements 202, 204 can be further secured or connected to each other and/or to the support structure 208 (corresponding to support structure 104 in FIG. 1) by one or more weld beads 210 at any interface between such components. The weld bead 210 can be for added strength and stability, for example, to ensure that relative movement of the components is minimized. In some embodiments, the support elements 202 and 204 can be first connected with fasteners to each other and/or to the base substructure 208 and then the fasteners can be removed after all the components are welded in place with welding beads 210.

Figure 3:
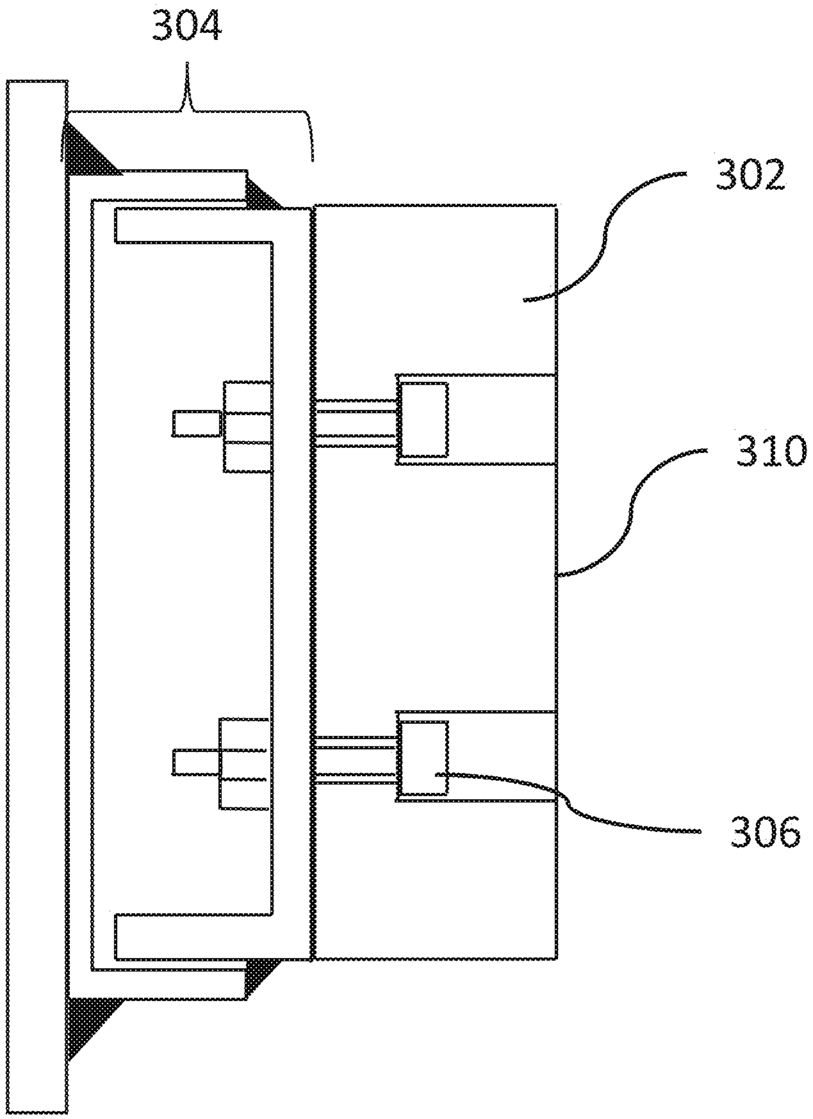
FIG. 3 conceptually illustrates a build plate for machining in accordance with embodiments.

The build support device 200 illustrated in FIG. 2 can provide a base structure for which a final building block can be attached. FIG. 3 further conceptually illustrates a final building block 302 (corresponding to building block 102 in FIG. 1) attached to a build support device 304 (corresponding to build support device 118 in FIG. 1 and build support device 200 in FIG. 2). The building block 302 can be attached by one or more mechanical fasteners 306 that can be positioned below (e.g., recessed below) the outer surface 310 of the building block 302. When the building block 302 is attached to the build support device 304, the outer surface 310 can be machined to a flatness that is acceptable for the production of a 3-D printed part, especially a metallic printed part. Accordingly, building blocks (e.g., building block 302) can be machinable in at least one embodiment.

Figure 4:
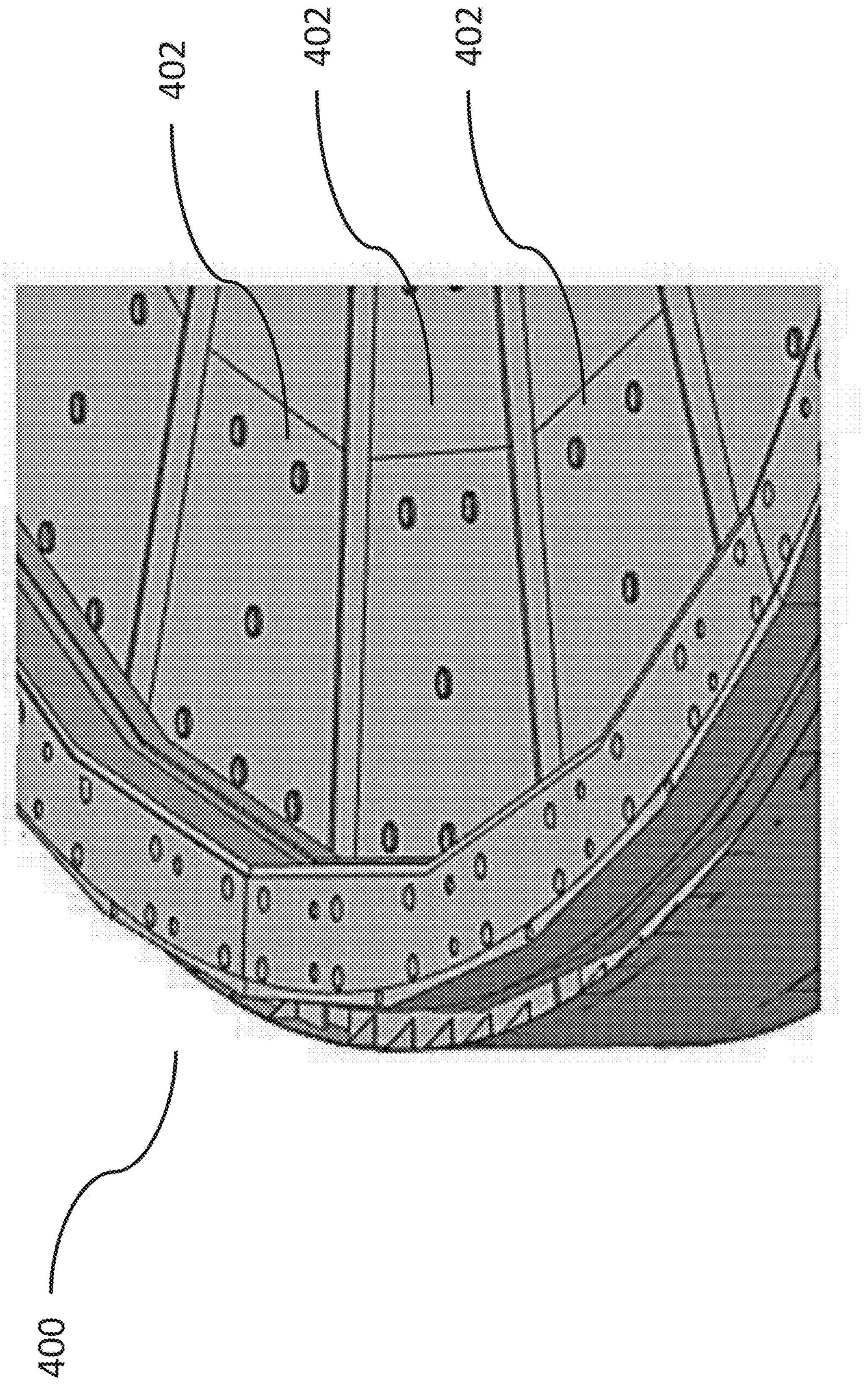
FIG. 4 conceptually illustrates a portion of a build support structure in accordance with embodiments.

As can be appreciated, FIGS. 2 and 3 illustrate an embodiment of only a portion of a complete build plate; many embodiments of a build plate can be made up of multiple components connected together to form the overall build plate volume for building metallic 3-D printed parts. This is further illustrated in FIG. 4 that shows a portion of a build plate volume 400 made up of multiple build plate assemblies 402 (similar to build plate assembly 100 in FIG. 1) that are interconnected to form the build plate volume 400.

Referring again to FIG. 3, as can be appreciated, the outer surface 310 of the building block 302 can have a geometry suitable for accommodating a variety of different 3-D printed parts. For example, the outer surface 310 can be non-flat and conformal to a desired article of manufacture. This concept is illustrated in at least FIGS. 5A and 5B. For example, FIGS. 5A and 5B conceptually illustrate side views of two embodiments of a building block (similar to final building block 102 in FIG. 1 and final building block 302 in FIG. 3). As shown in FIG. 5A, the building block 502 has been partially machined on the edges to take on the illustrated cross section. The first and second edges 504 and 506 have been reduced in thickness from the central body of the building block 502. This can be beneficial in various embodiments of building 3-D printed parts because the shape of the final building block 502 can be configured to match a portion (e.g., a bottom surface) of the printed part.

Still referring to FIG. 5A, the final building block 502 can be connected to a build support device 508. The build support device 508 can be similar to the build support device 118 in FIG. 1, the build support device 200 in FIG. 2 and/or the build support device 304 in FIG. 3. The build support device 508 can provide a generally flat surface on which to mount a building block 502. Additionally, in many embodiments of final building block (e.g., final building block 502), an outer surface (e.g., the outer surface 510) can be machined to a planar tolerance that is acceptable within the desired build parameters. The outer surface 510 can be similar to the outer surface 310 as shown in FIG. 3.

Figure 5B:
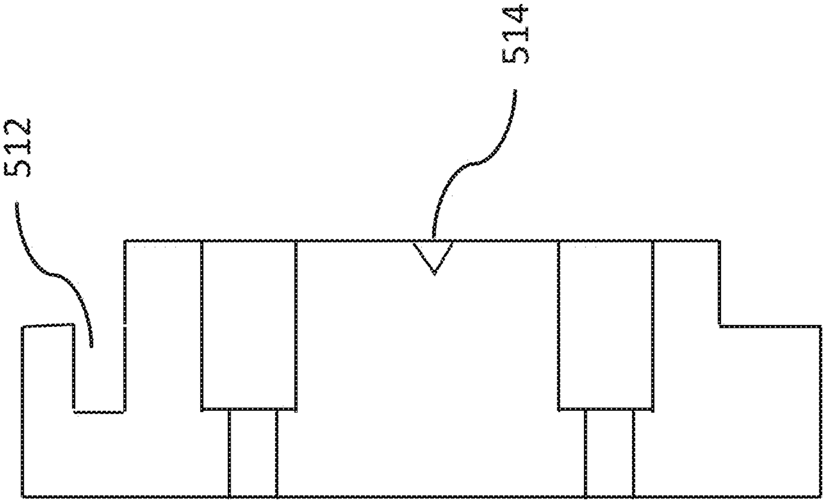
FIG. 5B conceptually illustrates a machinable component of a build plate in accordance with embodiments.
Figure 5A:
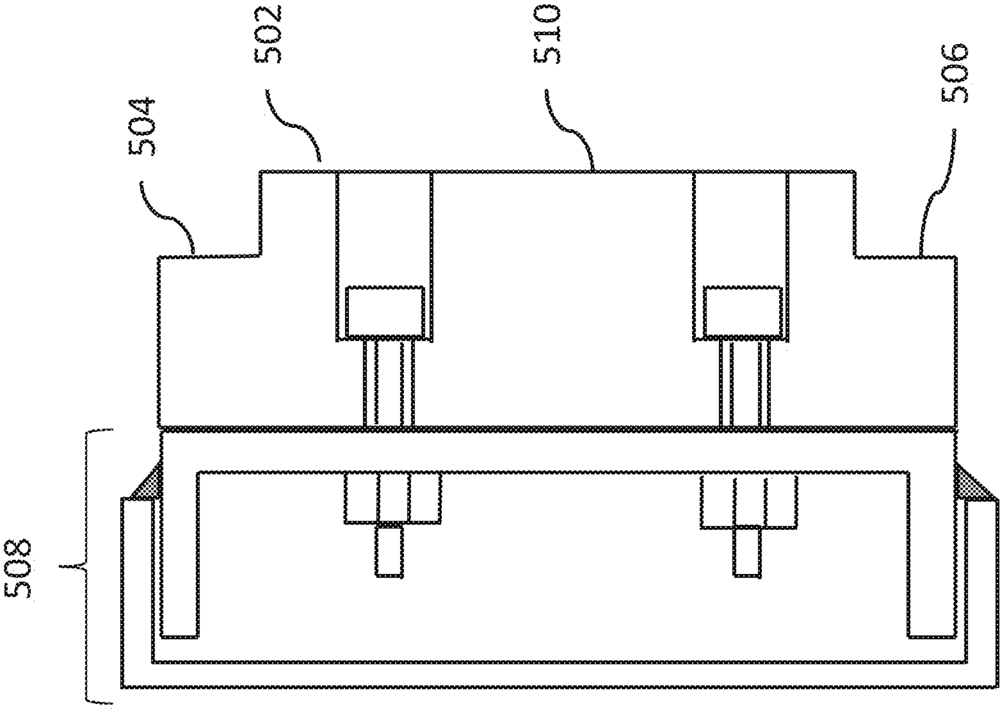
FIG. 5A conceptually illustrates components of a build plate in accordance with embodiments.
Figure 6:
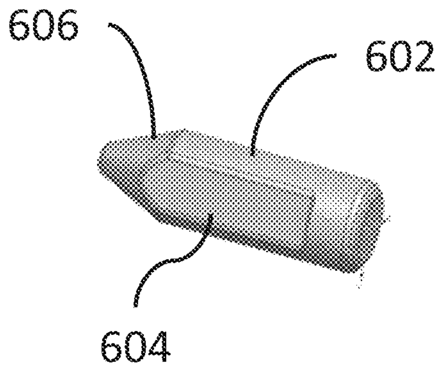
FIG. 6 conceptually illustrates an embodiment of an alignment pin for a build plate.

Turning next to FIG. 5B, this figure conceptually illustrates a building block 502 that has been machined with additional features to enable the printing of quality parts. For example, the first edge 504 in FIG. 5A can have an alignment slot 512, shown in FIG. 5B, machined into the final building block to allow for an alignment pin (an example of which is conceptually illustrated in FIG. 6, 602) to be inserted. Referring to FIGS. 5B and 6, the alignment pin (FIG. 6, 602) can help with aligning components on the final building block. This can be beneficial for maintaining tight tolerances.

Still referring to FIG. 5B, some embodiments of the building block additionally can have a groove 514 machined into the surface. The groove 514 can be used as a reference position for positioning a deposition system with respect to a part and/or build plate. In many embodiments, various different reference features can be used to aid in positioning work pieces (e.g., articles of manufacture) relative to build plates. For example, in circular build plates, the alignment slot 512 and/or a groove 514 can be disposed in each of a plurality of building blocks such that, for example, a continuous channel and/or groove is formed (e.g., formed by a plurality of alignment slots and/or grooves forming a continuous channel or groove across a plurality of building blocks) around the build plate. In some embodiments, the alignment slots and/or grooves disposed on a top surface of a building block such that a build plate, including a plurality of building blocks (e.g., building blocks 504), can have a number of circumferential grooves.

FIG. 6 conceptually illustrates an embodiment of an alignment pin 602 that can be inserted into an alignment slot similar to that illustrated as element 512 in FIG. 5B. Returning again to FIG. 6, in some embodiments of the alignment pin 602, the alignment pin 602 can have one or more flat surfaces 604 that can align with the walls of the alignment slot (e.g., FIG. 5B, 512). Additionally, in many embodiments, the alignment pin 602 can have a tapered tip 606 that can allow for an easier alignment process between the pin 602 and a receiving portion on a building block (e.g., building block 504).

FIGS. 7A through 8B illustrate various configurations of a build plate suitable for printing metallic components. For example, FIG. 7A conceptually illustrates a final building block 700 (corresponding to the building block 502 in FIG. 5A) with a cartridge or adapter 702 that has been printed onto the final building block 700. The outer flange 704 of the cartridge or adapter can be printed with an outer surface 706 that aligns with the first edge 708 (corresponding to first edge 504 in FIG. 5A) of the building block 700. As can be appreciated, the cartridge or adapter 702 can be machined while on the building block 700 to a desired tolerance. Additionally, the cartridge or adapter 702 can be removed from the build plate 700 at a cut line 710. This can allow for the cartridge or adapter 702 to be removed and then flipped so that it can be reinstalled onto the building block 700 for subsequent printing processes, as explained in more detail particularly with regard to FIGS. 8A and 8B, discussed below.

Figure 7A:
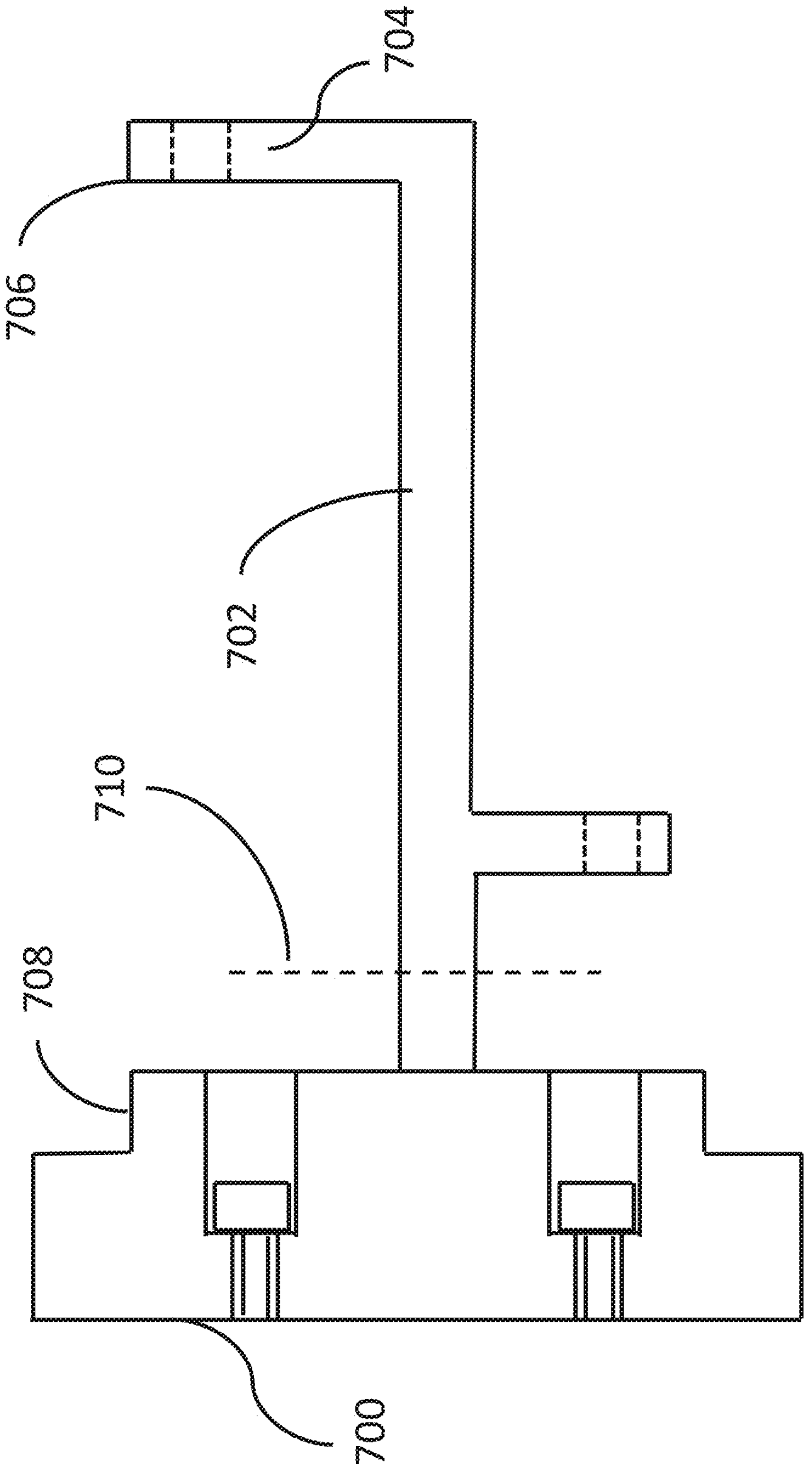
FIGS. 7A through 8B conceptually illustrate various printed elements and methods of manufacture thereof in accordance with embodiments.
Figure 7C:
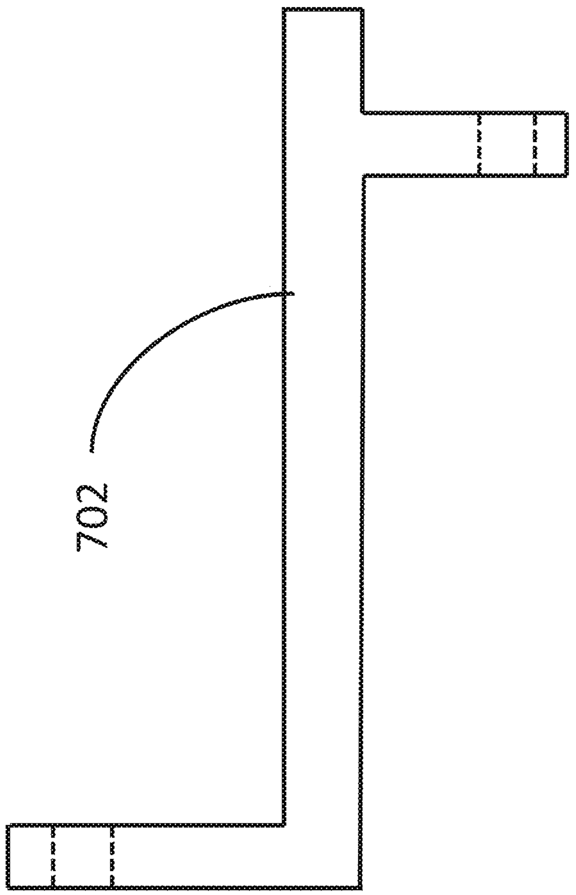
Figure 7B:
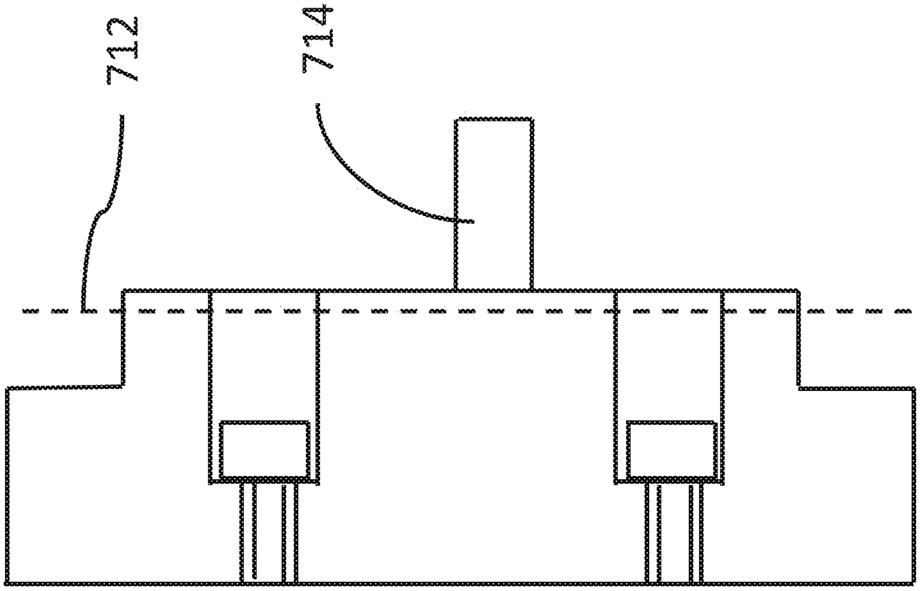

For example, FIG. 7C illustrates the cartridge or adapter 702 in a removed and flipped position vis-à-vis its position shown in FIG. 7A. FIG. 7B illustrates a proposed machining line 712. Excess cartridge material 714 can be removed from the building block to the right (in FIG. 7B) of the proposed machining line 712. The removal of the excess cartridge material 714 and a small portion of the building block (not labeled in FIG. 7B) can allow for the building surface to be re-machined to the desired planar tolerance in order to continue building. This would subsequently allow the cartridge or adapter 702 to be flipped and then reinstalled onto the build plate for additional printing and/or machining while maintaining the desired planar tolerance for building the remainder of the part, as discussed in more detail particularly with respect to FIGS. 8A and 8B below.

Figure 7D:
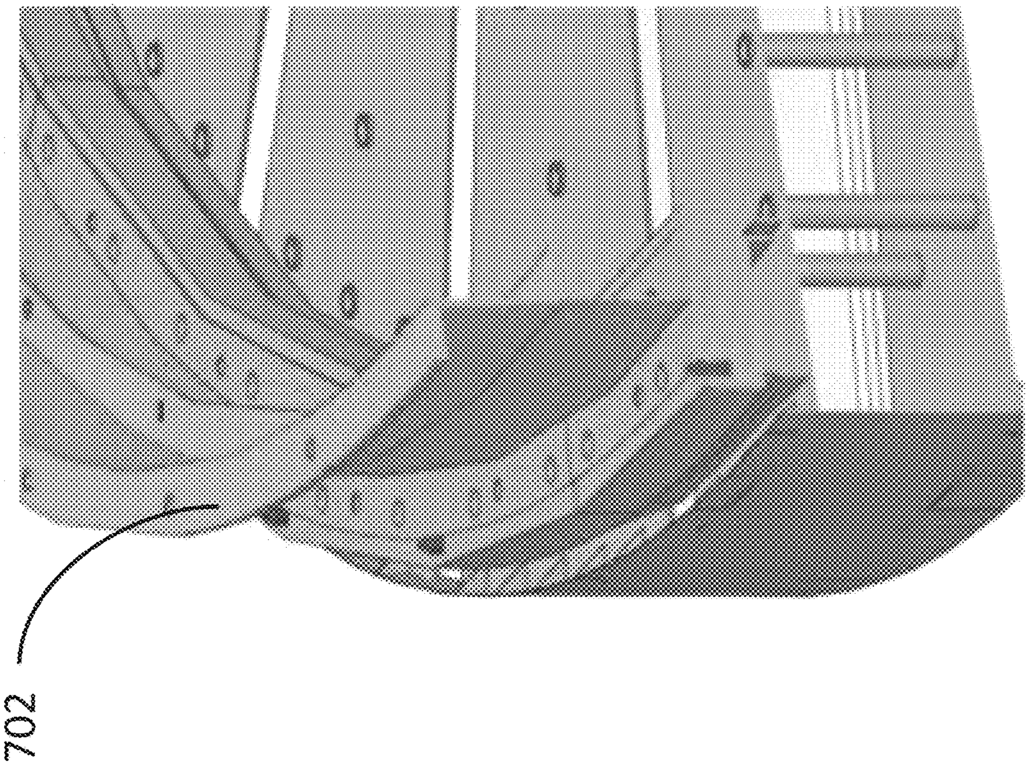

FIG. 7D conceptually illustrates the printed cartridge and/or adapter 702 in relation to the build plate as described and illustrated in FIGS. 7A through 7C. In accordance with various embodiments of the invention, the machinable build plate can have a top surface configured to conform to the bottom surface of a desired article that is to be printed. In this way, the bottom surface of an article printed on a build plate as described herein can have one or more non-planar features.

Figure 8A:
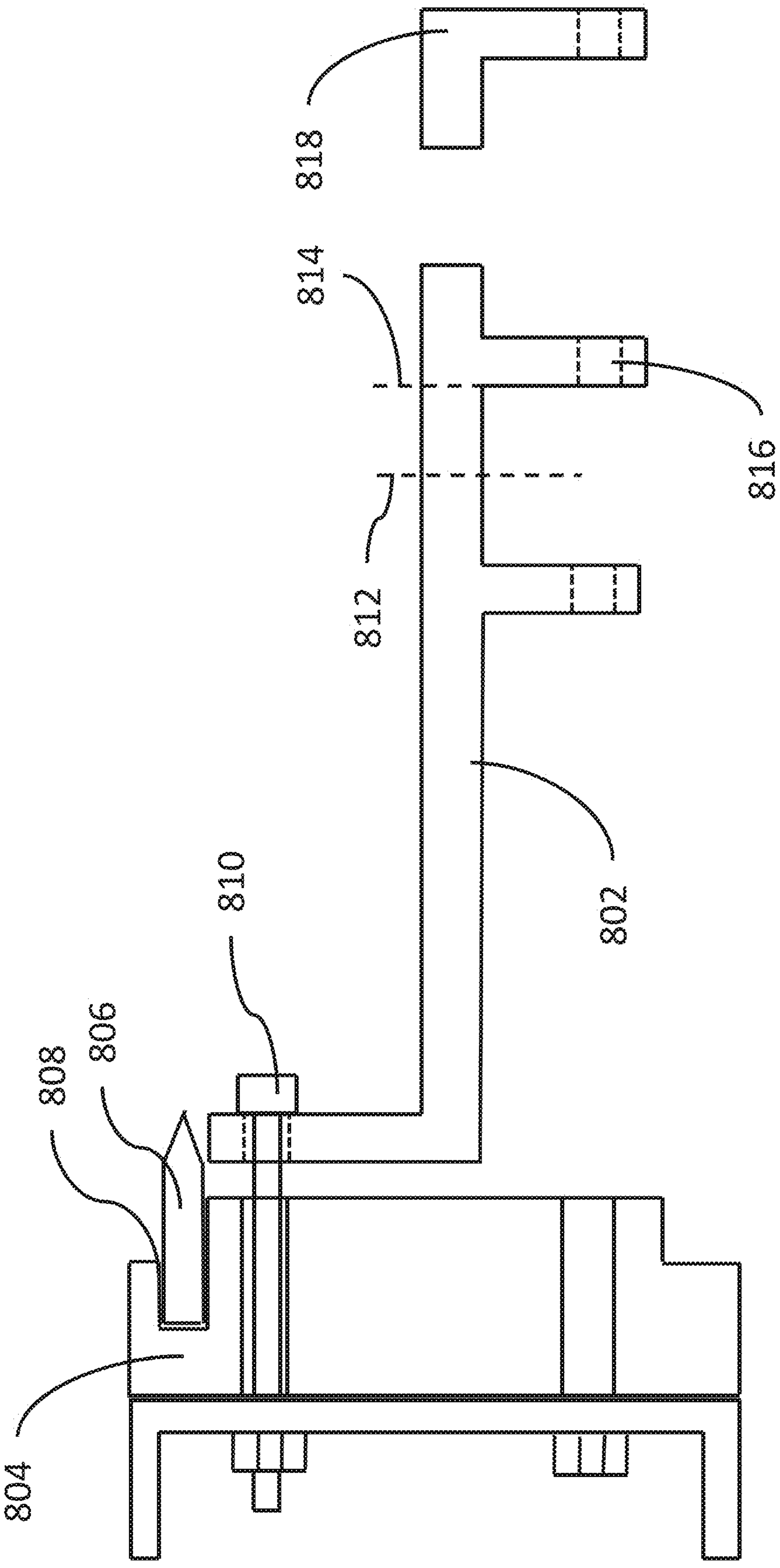
Figure 8B:
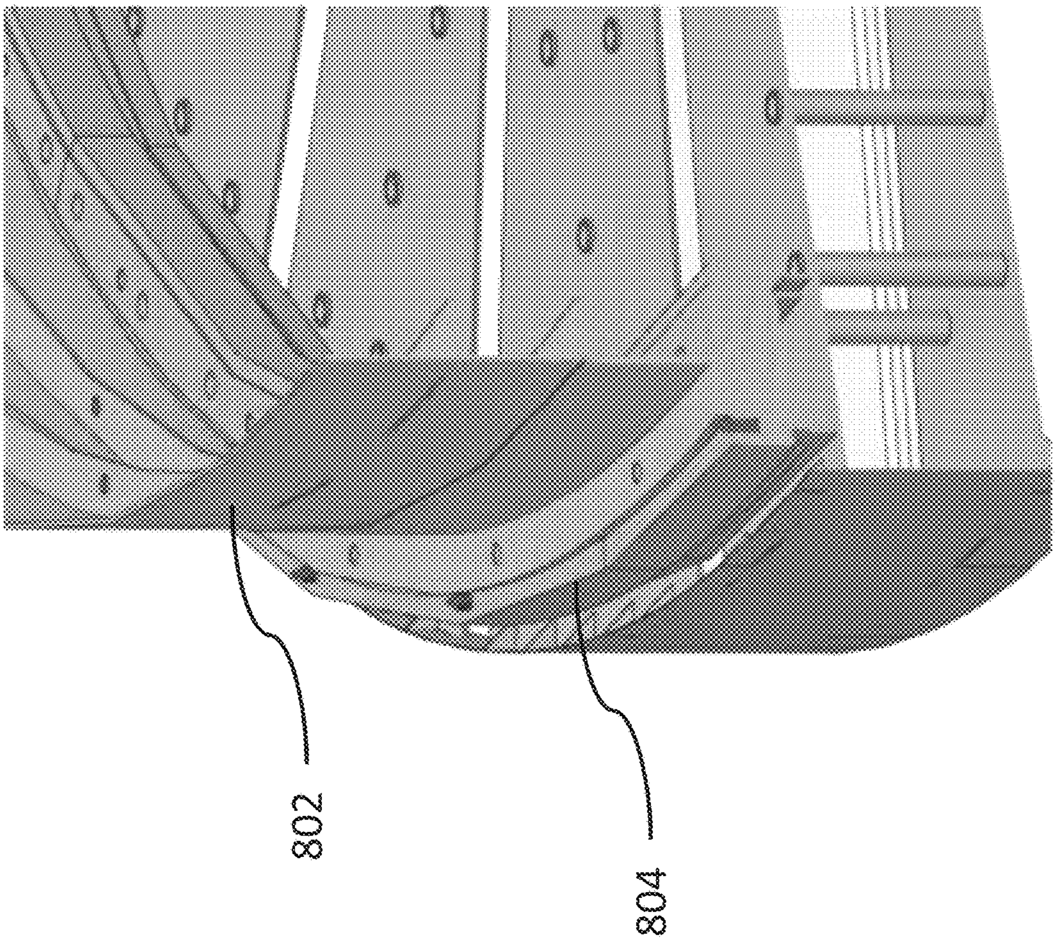

FIGS. 8A and 8B illustrate a cartridge or adapter 802 (corresponding to cartridge or adapter 702 in FIG. 7A) that has been flipped and then attached to the building block 804 (compare with the building block configuration in FIG. 5B) in accordance with various embodiments. The flipped cartridge or adapter 802 can be properly aligned with an alignment pin 806 (corresponding with alignment pin 602 in FIG. 6) positioned in a alignment slot 808 (corresponding to alignment slide 512 in FIG. 5B) in the building block 804. The flipped cartridge or adapter 802 can be attached to the building block 804 by one or more fasteners 810 or any other suitable means for securing the part, to allow for additional printing and/or machining. As illustrated by the dashed lines 812 and 814, the cartridge or adapter 802 can be machined back and then have one or more additional flanged segments 816 and/or 818 printed onto that machined part. The use of the building block 804, as described throughout, can allow for the precision printing of additional features onto the cartridge(s) or adapter(s) or other printed parts because the machinable building block 804 can maintain the desired tolerance or be machined to an acceptable tolerance for printing.

FIG. 8B conceptually illustrates the flipped cartridge/adapter 802 installed onto a building block 804 within a section of the build volume. Generally, and in accordance with various embodiments of the invention, an article can be manufactured in a first orientation on the build plate. Then, after the build plate is subjected to further removal and/or machining, the article can be replaced on the build plate (e.g., in a new orientation) and the article can be subjected to additional additive manufacturing (e.g., by additively manufacturing a second article onto the first article).

As can be fully appreciated, the process of building and machining the build plate, in accordance with many embodiments, can be applicable to any form of 3-D printing. For example, some embodiments may use the configurable and machinable build plate for vertical 3-D printing while other embodiments can take advantage of the adaptability to produce parts on a horizontal 3-D printing machine. Given the customizable nature of 3-D printing, it can be appreciated that the adaptability and ease of manufacture of the build plates described herein can be highly advantageous in printing large complex structures that would not otherwise be capable using more traditional methods and tools. The inventors realized that the process of building and machining the build plate discussed herein has particular utility in wire-arc additive manufacturing or other 3D printing technologies where the diameter of the build plate is greater than at least 50 inches; at least 55 inches; at least 1 foot; at least 5 feet; at least 10 feet; at least 15 feet; at least 20 feet; or at least 25 feet.

In addition, it can be appreciated that the customizable nature of the build plate assembly allows the re-installation of previously printed parts for further supplemental printing or manufacturing as required by utilizing custom machined entities for installation and alignment easy.

Figure 9:
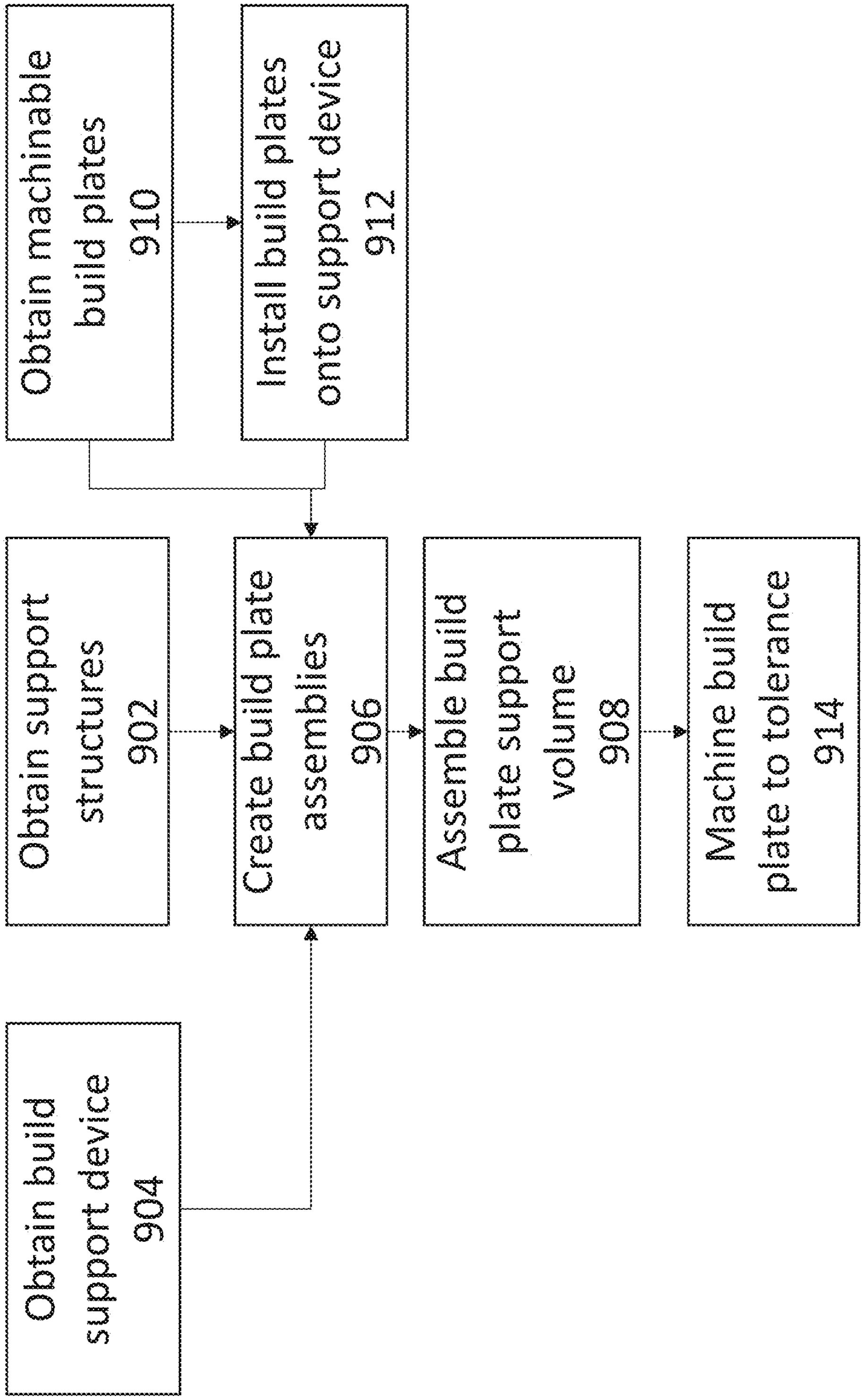
FIG. 9 conceptually illustrates a process of producing a build plate in accordance with embodiments.

FIG. 9 conceptually illustrates an embodiment of a process by which a configurable re-machinable build plate can be constructed. Initially, the process involves obtaining the various components of the build plate such as the elements that make up the support structures (902) and the support device (904). The sources can also be combined to accommodate a larger variety of part sizes and configurations. Additionally, in order to create the various assemblies (906) and build the support volume (908) machinable build plates need to be obtained (910) and installed onto the support devices (912). The installation of the build plates onto the support devices (912) can occur at any point once the support devices have been obtained and/or created (904). Once the build volume has been assembled to the desired structure (908) the machinable build plates can be machined (914) using any suitable method. In many embodiments, the same machine used to print the part can be configured to machine the surface of the build plate to within an acceptable flatness tolerance for printing the desired part.

DOCTRINE OF EQUIVALENTS

This description of the invention has been presented for the purposes of illustration and description. It is not intended to be exhaustive or to limit the invention to the precise form described, and modifications and variations are possible in light of the teachings above. The embodiments were chosen and described to explain the principles of the invention and its practical applications. This description will enable others skilled in the art to best utilize and practice the invention in various embodiments and with various modifications as are suited to a particular use. The scope of the invention is defined by the following claims.

What is claimed is:

1. An additive manufacturing build plate comprising:
- a build structure with a first planar tolerance in a build structure plane; and
- a plurality of build plate assemblies, wherein each build plate assembly comprises:
  - a build support device coupled to the build structure; and
  - a machinable build block coupled to the build support device, wherein an outer surface of the machinable build block is machinable to a second planar tolerance while the machinable build block is coupled to the build support device and while the build support device is coupled to the build structure, wherein the second planar tolerance is in an outer surface plane that is substantially parallel to the build structure plane;
- wherein the plurality of build plate assemblies form a substantially continuous build plate surface.

2. The additive manufacturing build plate of claim 1, wherein the second planar tolerance is more precise than the first planar tolerance.

3. The additive manufacturing build plate of claim 1, wherein the machinable build block is coupled using mechanical fasteners to the build support device.

4. The additive manufacturing build plate of claim 3, wherein the mechanical fasteners are recessed from a top surface of the machinable build block.

5. The additive manufacturing build plate of claim 1, wherein the machinable build block comprises reference features capable of being used as a datum for an additive manufacturing process.

6. A method for additively manufacturing articles, the method comprising:
- coupling a plurality of machinable build blocks to a respective plurality of build support devices, thereby forming a plurality of build plate assemblies;
- coupling the plurality of build plate assemblies to a build structure with a first planar tolerance in a build structure plane;
- machining a plurality of outer surfaces of the machinable build blocks of the build plate assemblies to a second planar tolerance in an outer surface plane that is substantially parallel to the build structure plane while the plurality of build plate assemblies are coupled to the build structure;
- additively manufacturing a first article on the plurality of outer surfaces of the machinable build blocks of the build plate assemblies;
- removing the first article from the plurality of outer surfaces;
- machining, after removing the first article from the plurality of outer surfaces, the plurality of outer surfaces of the machinable build blocks of the build plate assemblies while the plurality of build plate assemblies are coupled to the build structure;
- coupling the first article to the plurality of outer surfaces; and
- additively manufacturing a second article onto the first article.

7. The method of claim 6, wherein coupling the plurality of build plate assemblies to the build structure is performed using mechanical fasteners.

8. The method of claim 6, wherein the machining is performed by an additive manufacturing apparatus equipped with a machining tool.

9. The method of claim 6, wherein the build plate assemblies comprise at least one reference feature for aligning the first article when the first article is coupled to the build structure.

10. The method of claim 6, wherein the first article comprises first alignment features, and the plurality of machinable build blocks comprise second alignment features corresponding to the first alignment features when the first article is coupled to the build structure.

11. The method of claim 6, wherein the plurality of machinable build blocks comprise reference features capable of being used as at least one datum for an additive manufacturing process.

12. A method for additively manufacturing an article, the method comprising:
- coupling a plurality of machinable build blocks to a respective plurality of build support devices, thereby forming a plurality of build plate assemblies;
- coupling the plurality of build plate assemblies to the build structure;
- machining a plurality of outer surfaces of the machinable build blocks of the build plate assemblies to a second planar tolerance in an outer surface plane that is substantially parallel to the build structure plane while the plurality of build plate assemblies are coupled to the build structure; and
- additively manufacturing an article on the plurality of outer surfaces of the machinable build blocks of the build plate assemblies.

13. The method of claim 12, wherein coupling the plurality of build plate assemblies is performed using at least one mechanical fasteners.

14. The method of claim 13, wherein a top of the at least one mechanical fastener is below a top surface of the machinable build block.

15. The method of claim 12, wherein the plurality of machinable build blocks comprise reference features capable of being used as a datum for an additive manufacturing process.

16. The method of claim 12, further comprising removing the article from the plurality of machinable build blocks and machining the plurality of outer surfaces with a second desired planar tolerance.

17. The method of claim 16, wherein the article comprises first alignment features, and the plurality of machinable build blocks comprise second alignment features corresponding to the first alignment features when the article is coupled to the build structure.

18. The method of claim 12, further comprising coupling the article to the build structure and additively manufacturing a second article onto the first article.

19. The method of claim 18, wherein the build plate assemblies comprise reference features for aligning the first article when the first article is coupled to the build structure.

20. The method of claim 12, wherein the outer surface plane conforms to a desired bottom surface of the first article.

* * * * *